S. T. LEWIS.
CHUCK.
APPLICATION FILED APR. 30, 1908.

938,390.

Patented Oct. 26, 1909.

WITNESSES
R. A. Balderson
R. D. Little

INVENTOR
S. T. Lewis,
by Bakewell, Byrnes & Parmelee,
his Attys.

UNITED STATES PATENT OFFICE.

SHERMAN T. LEWIS, OF SWISSVALE, PENNSYLVANIA.

CHUCK.

938,390.  Specification of Letters Patent.  Patented Oct. 26, 1909.

Application filed April 30, 1908. Serial No. 430,081.

*To all whom it may concern:*

Be it known that I, SHERMAN T. LEWIS, of Swissvale, Allegheny county, Pennsylvania, have invented a new and useful Improvement in Chucks, of which the following is a full, clear, and exact description, reference being had to the accompanying drawings, forming part of this specification, in which—

Figure 1:
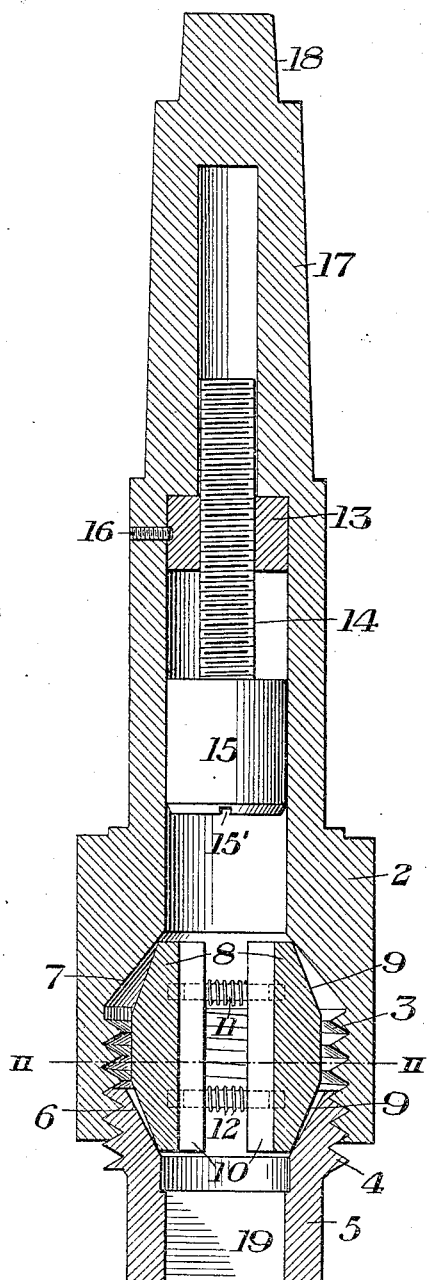
Figure 4:
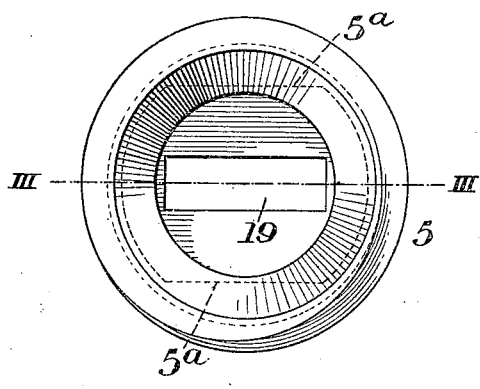
Figure 3:
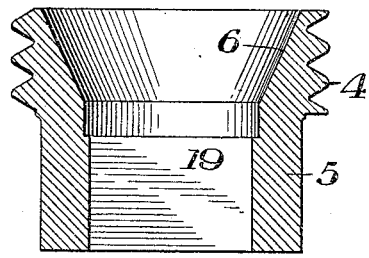
Figure 2:
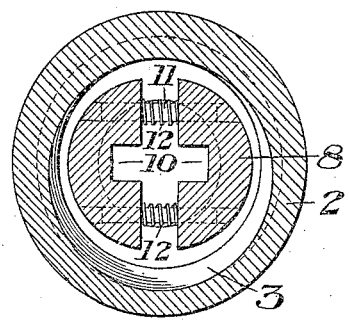

Figure 1 is a longitudinal sectional view showing the arrangement and construction of the parts as assembled to form my improved chuck; Fig. 2 is a transverse section of the same on the line II—II of Fig. 1; Fig. 3 is a detail longitudinal sectional view of a jaw tightening nut forming part of my invention; Fig. 4 is a top plan view of the same.

My invention relates to chucks for holding drills and similar articles while employed in drilling holes, and it more particularly relates to drill chucks used with flat drills which have a rectangular cross section or with drills provided with a shank of rectangular cross section.

It also consists in improved means by which flat drills of various lengths can be secured and held so as to project a predetermined distance beyond the end of the chuck.

In the drawings, 2 represents a sleeve having a central longitudinal opening provided therein. The outer end of the opening is provided with internal screw threads 3 which engage the coacting external threads 4 upon the jaw tightening screw 5. The interior of the tightening screw 5 and the opening in the sleeve 2 are provided with oppositely extending tapering or conical faces 6 and 7. Gripping jaws 8 having oppositely extending tapering surfaces 9 on their outer longitudinal edges are inserted in the opening in the sleeve 2 between the tapering faces 6 and 7 in the screw and in the sleeve. These gripping jaws are provided with longitudinally extending slots 10 in which a drill of rectangular cross section or the rectangular shank of a drill having a circular cross section is inserted. Dowel pins 11 are inserted in suitable holes in the gripping jaws so as to keep these jaws in the desired position relative to one another, and helical springs 12 are placed on the pins 11 between the opposing faces of the jaws so as to expand the jaws and keep them in their extended position and permit the drills to be easily and quickly inserted in place. A threaded nut 13 is inserted in the inner end of the longitudinal opening in the sleeve 2 in which nut an adjusting screw 14 having an enlarged circular head 15 is placed. The nut 13 is held in place and is prevented from rotating by means of a set screw 16 and a slot 15′ is provided in the head 15 of the bolt 14 by which it is turned in being adjusted in the recessed sleeve 2. The outer end of the sleeve 2 is provided with the usual tapered shank 17 and tang 18 which are adapted to fit into a suitable opening in the spindle of a drill press or other machine tool.

A rectangular slot 19 is provided in the tightening screw 5 through which slot the drill is inserted until it comes into engagement with the head of the adjusting screw 14, this screw acting as a stop and limiting the inward movement of the drill in the sleeve 2. The screw and drill are then turned relatively to the sleeve 2 until the engaging wedging faces 6, 7 and 9 on the interior of the screw and sleeve and on the outer surface of the gripping jaws 8 are wedged in place. As the screw 5 is turned, the jaws 8 become wedged together so as to center and tightly grip the drill in position in the sleeve of the chuck.

It will be noted that by means of the construction shown, the gripping force of the gripping jaws increases with the resistance of the screw to turning when the drill is in operation. The screw 5 is provided with flattened portions 5$^a$ on its outer surface which may be grasped by a wrench or other device, in order to tighten and loosen it in the chuck.

Drills of various lengths may be used with my improved chuck and the distance which drills of different lengths project from the chuck may be made constant by adjusting the screw stop 14 on the interior of the sleeve 2.

The advantages of my invention arise from the simplicity and compactness of the parts and by the improved construction of the tightening screw by which the gripping jaws are wedged in the chuck so as to center and securely hold the drill in place. The drills have a bearing on the sides of the rectangular slots or openings in the screw, in this way strengthening the drills and providing a more efficient drilling mechanism than is possible where the drill is grasped at a relatively greater distance from its cutting point.

By providing a chuck with means by which drills of various lengths may be used that will extend varying distances beyond the end of the chuck, is of particular advantage when used with a multiple spindle drill press as this insures all of the drills so used starting and finishing the drilling operation simultaneously.

While I have shown my invention as applied to a drill chuck for drill presses having a comparatively short shank, the invention is applicable for use on drill spindles, in which case the jaw holding sleeve can be formed integral with a spindle of relatively long length. The apparatus is particularly applicable to chucks or similar apparatus in which drills having a rectangular cross section are employed, but may be adapted to many other uses.

Modifications in the arrangement and construction of the parts may be made without departing from my invention.

I claim:—

1. A drill chuck comprising a recessed sleeve having a tapered counterbore therein, gripping jaws located in said counterbore having oppositely extended tapering ends and jaw-tightening means engaging with the recessed sleeve and having a tapering recess receiving the tapered end of said jaws, said jaw-tightening means having a rectangular opening through which the drill is inserted into the chuck and having means adapted to cause a tightening effect upon the jaws when the chuck is in operation; substantially as described.

2. A drill chuck comprising a recessed sleeve having a threaded counterbore therein with a tapering inner end, gripping jaws located in said counter bore and having oppositely extending tapering ends, and a jaw-tightening screw fitting the counterbore having a tapering recess receiving the tapering end of said jaws, said screw having a rectangular opening through which the drill is inserted into the chuck; substantially as described.

3. A drill chuck comprising a recessed sleeve having a threaded counterbore therein with a tapering inner end, gripping jaws located in said counterbore having oppositely extending tapering ends, and a jaw-tightening screw fitting the counterbore having a tapering recess receiving the tapered ends of said jaws, said screw having a non-circular opening through which the drill is inserted into the chuck, the walls of said opening embracing the drill at a point intermediate of its ends, said screws being arranged to impart a tightening effect upon the gripping jaws when the chuck is rotated; substantially as described.

In testimony whereof, I have hereunto set my hand.

SHERMAN T. LEWIS.

Witnesses:
G. E. F. GRAY,
FRANK A. POWER.